(12) United States Patent
Sasaki et al.

(10) Patent No.: US 10,509,983 B2
(45) Date of Patent: Dec. 17, 2019

(54) OPERATING DEVICE, OPERATING SYSTEM, OPERATING METHOD, AND PROGRAM THEREFOR

(71) Applicant: KABUSHIKI KAISHA TOPCON, Itabashi-ku (JP)

(72) Inventors: You Sasaki, Itabashi-ku (JP); Tadayuki Ito, Itabashi-ku (JP)

(73) Assignee: KABUSHIKI KAISHA TOPCON, Tokyo (JP)

( * ) Notice: Subject to any disclaimer, the term of this patent is extended or adjusted under 35 U.S.C. 154(b) by 125 days.

(21) Appl. No.: 14/843,298

(22) Filed: Sep. 2, 2015

(65) Prior Publication Data
US 2016/0070981 A1 Mar. 10, 2016

(30) Foreign Application Priority Data
Sep. 8, 2014 (JP) .................. 2014-182100

(51) Int. Cl.
*G06K 9/62* (2006.01)
*G01S 17/02* (2006.01)
(Continued)

(52) U.S. Cl.
CPC .............. *G06K 9/6202* (2013.01); *B60R 1/00* (2013.01); *G01S 7/4808* (2013.01);
(Continued)

(58) Field of Classification Search
CPC .......... G01S 17/89; G01S 17/42; G01S 17/66; G01S 17/023; G01C 15/002; G01C 11/02;
(Continued)

(56) References Cited

U.S. PATENT DOCUMENTS

| 2010/0034426 A1* | 2/2010 | Takiguchi .......... G01C 21/3602 382/106 |
| 2013/0236107 A1 | 9/2013 | Fukaya et al. |
| 2014/0253689 A1* | 9/2014 | Kumagai .......... H04N 13/0275 348/46 |

FOREIGN PATENT DOCUMENTS

| GB | 2507560 A | 5/2014 |
| JP | 2013-40886 | 2/2013 |

(Continued)

OTHER PUBLICATIONS

U.S. Appl. No. 14/834,657, filed Aug. 25, 2015, Sasaki, et al.
(Continued)

*Primary Examiner* — Farhan Mahmud
(74) *Attorney, Agent, or Firm* — Xsensus, LLP

(57) ABSTRACT

A technique for efficiently calibrating a camera is provided. Reference laser scan data is obtained by scanning a building 131 by a laser scanner 115, which is fixed on a vehicle 100 and has known exterior orientation parameters, while the vehicle 100 travels. An image of the building 131 is photographed at a predetermined timing by an onboard camera 113. Reference point cloud position data, in which the reference laser scan data is described in a coordinate system defined on the vehicle 100 at the predetermined timing, is calculated based on the trajectory the vehicle 100 has traveled. Matching points are selected between feature points in the reference point cloud position data and in the image. Exterior orientation parameters of the camera 113 are calculated based on relative relationships between the reference point cloud position data and image coordinate values in the image of the matching points.

12 Claims, 3 Drawing Sheets

(51) Int. Cl.
  *G01S 17/42* (2006.01)
  *G01S 17/89* (2006.01)
  *G06K 9/00* (2006.01)
  *G06K 9/52* (2006.01)
  *G01S 7/48* (2006.01)
  *G01S 7/497* (2006.01)
  *B60R 1/00* (2006.01)
  *G06T 7/60* (2017.01)
  *H04N 17/00* (2006.01)
  *G06T 7/80* (2017.01)

(52) U.S. Cl.
  CPC .......... *G01S 7/4972* (2013.01); *G01S 17/023* (2013.01); *G01S 17/42* (2013.01); *G01S 17/89* (2013.01); *G06K 9/00791* (2013.01); *G06K 9/52* (2013.01); *G06T 7/60* (2013.01); *G06T 7/80* (2017.01); *H04N 17/002* (2013.01); *G06T 2200/04* (2013.01); *G06T 2207/10016* (2013.01); *G06T 2207/10028* (2013.01); *G06T 2207/30252* (2013.01)

(58) Field of Classification Search
  CPC ................. G01C 11/06; G01C 21/165; G06T 2207/30244; G06T 2207/10028; G06T 7/73; G06T 2207/30252; G06T 7/521; G06T 17/00; G01B 11/25; G01B 11/002
  See application file for complete search history.

(56) References Cited

FOREIGN PATENT DOCUMENTS

| | | |
|---|---|---|
| JP | 2013-186816 | 9/2013 |
| JP | 2013-242186 A1 | 12/2013 |

OTHER PUBLICATIONS

U.S. Appl. No. 14/834,553, filed Aug. 25, 2015, Sasaki, et al.
U.S. Appl. No. 14/834,633, filed Aug. 25, 2015, Sasaki, et al.
U.S. Appl. No. 14/843,298, filed Sep. 2, 2015, Sasaki, et al.
Extended Search Report dated Feb. 9, 2016 in European Patent Application No. 15183526.1
Office Action dated Aug. 27, 2018 in Japanese Patent Application No. 2014-182100 (with English language translation).

* cited by examiner

OPERATING DEVICE, OPERATING SYSTEM, OPERATING METHOD, AND PROGRAM THEREFOR

BACKGROUND OF THE INVENTION

Technical Field

The present invention relates to a technique for performing calibration of a camera.

Background Art

A technique for obtaining three-dimensional image data of circumstances surrounding a vehicle travelling while the vehicle is equipped with a GNSS unit, an IMU (Inertial Measurement Unit), a camera, a laser scanner, etc., is publicly known (for example, refer to Japanese Unexamined Patent Application Laid-Open No. 2013-40886).

In this technique, calibration for determining position and attitude of the IMU with respect to the vehicle and exterior orientation parameters (position and attitude) of the camera and the laser scanner with respect to the IMU must be preliminarily performed. Typically, such calibration is performed when the product is shipped. However, there may be cases in which a user desires to mount a camera at a freely selected position with a freely selected attitude. In addition, there may also be cases in which a user desires to change the position and the attitude of the camera for some reason.

SUMMARY OF THE INVENTION

However, calibration of a typical method requires complicated procedures and is not easily performed by a user. In view of these circumstances, an object of the present invention is to provide a technique for efficiently performing calibration of a camera.

A first aspect of the present invention provides an operating device including a reference laser scan data obtaining circuit, an image data obtaining circuit, a reference point cloud position data calculator, a matching point selecting circuit, and an exterior orientation parameter calculator. The reference laser scan data obtaining circuit has a structure that obtains laser scan data, which is obtained by scanning an object to be measured with laser light by a laser scanner while a vehicle travels, as reference laser scan data. The laser scanner is fixed on the vehicle and has exterior orientation parameters with respect to the vehicle, which are determined. The image data obtaining circuit has a structure that obtains data of an image of the object, which is photographed at a predetermined timing by a camera that is fixed on the vehicle while the vehicle travels. The reference point cloud position data calculator calculates reference point cloud position data, in which the reference laser scan data is described in a coordinate system defined on the vehicle at the predetermined timing, based on a trajectory the vehicle has travelled. The matching point selecting circuit has a structure that selects matching points between the reference point cloud position data and the image. The exterior orientation parameter calculator calculates exterior orientation parameters of the camera with respect to the vehicle based on the reference point cloud position data of the matching points and image coordinate values of the matching points in the image.

According to a second aspect of the present invention, in the first aspect of the present invention, the image may be photographed at plural timings, and the reference point cloud position data calculator may calculate plural reference point cloud position data, in which each reference point cloud position data is described in a coordinate system defined on the vehicle at each of the plural timings. In this case, the matching point selecting circuit selects matching points between the image and the reference point cloud position data, which are obtained at the same timing. In addition, the exterior orientation parameter calculator calculates exterior orientation parameters of the camera with respect to the vehicle based on the reference point cloud position data of the matching points at the plural timings, which are superposed, and based on image coordinate values of the matching points in the images at the plural timings, which are superposed.

A third aspect of the present invention provides an operating system including a means for obtaining laser scan data, which is obtained by scanning an object to be measured with laser light by a laser scanner while a vehicle travels, as reference laser scan data. The laser scanner is fixed on the vehicle and has exterior orientation parameters with respect to the vehicle, which are determined. The operating system also includes a means for obtaining data of an image of the object, which is photographed at a predetermined timing by a camera that is fixed on the vehicle while the vehicle travels, and includes a means for calculating reference point cloud position data, in which the reference laser scan data is described in a coordinate system defined on the vehicle at the predetermined timing, based on a trajectory the vehicle has travelled. The operating system further includes a means for selecting matching points between the reference point cloud position data and the image and a means for calculating exterior orientation parameters of the camera with respect to the vehicle based on the reference point cloud position data of the matching points and image coordinate values of the matching points in the image.

A fourth aspect of the present invention provides an operating method including obtaining laser scan data, which is obtained by scanning an object to be measured with laser light by a laser scanner while a vehicle travels, as reference laser scan data. The laser scanner is fixed on the vehicle and has exterior orientation parameters with respect to the vehicle, which are determined. The operating method also includes obtaining data of an image of the object, which is photographed at a predetermined timing by a camera that is fixed on the vehicle while the vehicle travels, and calculating reference point cloud position data, in which the reference laser scan data is described in a coordinate system defined on the vehicle at the predetermined timing, based on a trajectory the vehicle has traveled. The operating method further includes selecting matching points between the reference point cloud position data and the image and calculating exterior orientation parameters of the camera with respect to the vehicle based on the reference point cloud position data of the matching points and image coordinate values of the matching points in the image.

A fifth aspect of the present invention provides a storage medium storing a program to be read and executed by a computer, the program allowing the computer to obtain laser scan data, which is obtained by scanning an object to be measured with laser light by a laser scanner while a vehicle travels, as reference laser scan data. The laser scanner is fixed on the vehicle and has exterior orientation parameters with respect to the vehicle, which are determined. The program also allows the computer to obtain data of an image of the object, which is photographed at a predetermined timing by a camera that is fixed on the vehicle while the vehicle travels, and to calculate reference point cloud position data, in which the reference laser scan data is described in a coordinate system defined on the vehicle at the predetermined timing. The program also allows the computer to select matching points between the reference point cloud position data and the image and to calculate exterior orientation parameters of the camera with respect to the vehicle based on the reference point cloud position data of the matching points and image coordinate values of the matching points in the image.

According to the present invention, calibration of a camera can be performed efficiently.

PREFERRED EMBODIMENTS OF THE INVENTION

Structure

Figure 1:
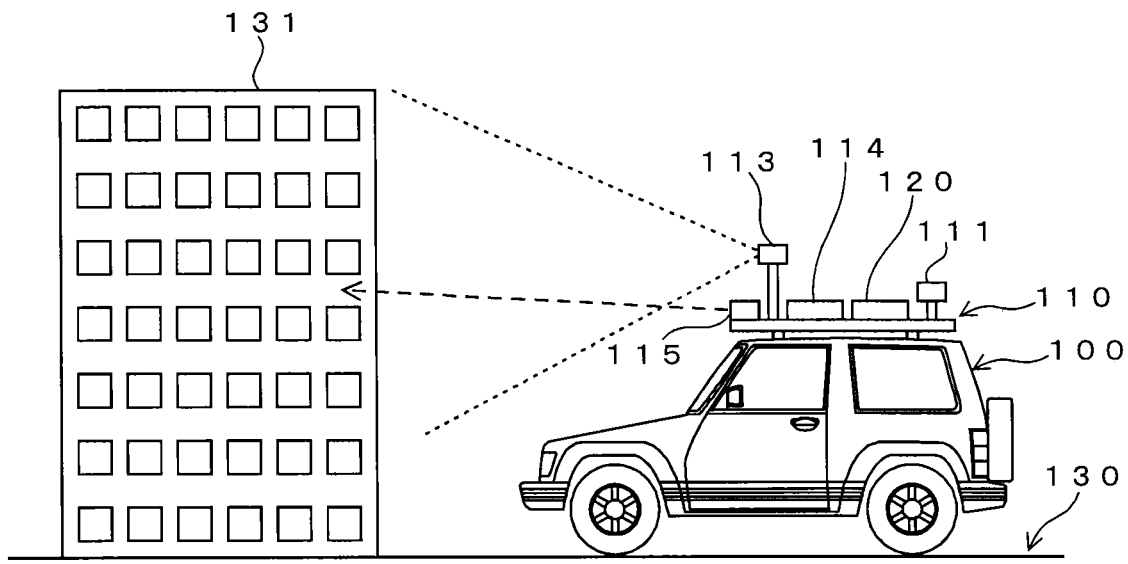
FIG. 1 is a conceptual diagram of an embodiment.

FIG. 1 shows a conceptual diagram of an embodiment. In this embodiment, exterior orientation parameters of a camera 113 mounted on a vehicle 100 are calculated. Here, position and attitude with respect to an IMU 114 are used as the exterior orientation parameters of the camera 113. Position and attitude of the IMU 114 with respect to a measuring system 110 are preliminarily determined, and position and attitude of the measuring system 110 with respect to the vehicle 100 are also preliminarily determined. Therefore, the calculation of the exterior orientation parameters of the camera 113 with respect to the IMU 114 corresponds to calculation of the exterior orientation parameters of the camera 113 with respect to the vehicle 100.

The vehicle 100 is mounted with the measuring system 110. The measuring system 110 includes a GNSS unit 111, a processor 120, the IMU 114, the camera 113, and a laser scanner 115, which are arranged on a base.

The GNSS unit 111 receives navigation signals from a navigation satellite forming a GNSS (Global Navigation Satellite System) and outputs its location information and time information, which is calibrated and has high precision. The camera 113 is directed to a particular direction and photographs moving images within a predetermined visual field in this direction. As the camera 113, a panoramic camera, which can photograph conditions in 360 degrees, or a wide-angle camera, may be used.

The IMU 114 is an inertial measurement unit, and it detects acceleration and measures changes in its location and direction. The laser scanner 115 emits laser light on an object to be measured by scanning linearly and obtains point cloud position data of the object by detecting light reflected by the object. The laser scanner 115 performs laser scanning while the vehicle 100 travels, whereby point cloud position data in a direction in which the laser scanner 115 is directed is obtained.

The point cloud position data is formed of three-dimensional coordinate data of numerous points. According to the point cloud position data, an outer shape of the object is converted into data by a set of points in which three-dimensional coordinates are determined. In addition, the point cloud position data includes data relating to difference in intensity of laser light reflected. Therefore, by displaying the difference in the intensity of the laser light reflected, as difference in intensity of bright points, the appearance of the object can be perceived as a set of dot-like bright points when the point cloud position data is displayed on a two-dimensional screen.

The camera 113, the IMU 114, the laser scanner 115, and the processor 120 are provided with a synchronizing signal from the GNSS unit 111 by using GNSS, and they can operate synchronously. The IMU 114 is preliminarily calibrated based on a ground coordinate system. The ground coordinate system is an absolute coordinate system defined on the ground and is a three-dimensional orthogonal coordinate system for describing geographical locations measured by the GNSS unit 111. Moreover, the IMU 114 is calibrated at predetermined timings based on the location information and the time information, which are obtained from the GNSS unit 111. It should be noted that a device for generating a synchronizing signal may be prepared, and each part may be synchronously operated based on this synchronizing signal therefrom.

The following information is measured in advance and is stored in a memory of the processor 120. The information includes the position and the attitude of the measuring system 110 with respect to the vehicle 100, the position and the attitude of the IMU 114 on the measuring system 110, the position (position of an antenna part) of the GNSS unit 111 with respect to the IMU 114, and the position and the attitude of the laser scanner 115 with respect to the IMU 114. That is, the exterior orientation parameters of the laser scanner 115 with respect to the IMU 114 are preliminarily obtained.

The camera 113 is mounted on the measuring system 110 at a freely selected position in a freely selected direction (attitude) by a user. Therefore, exterior orientation parameters of the camera 113 with respect to the IMU 114 are not clear immediately after the camera 113 is mounted on the vehicle 100. It should be noted that the mounting position of the camera 113 is not limited to the base of the measuring system 100, and it can be mounted on the vehicle 100 at a freely selected location.

The processor 120 is hardware that functions as a computer and includes a CPU, a memory, a variety of interfaces, and other necessary electronic circuits. The processor 120 can be understood to be hardware including each functioning unit shown in FIG. 2. Each of the functioning units shown in FIG. 2 may be constructed of software, or one or a plurality of the functioning units may be constructed of dedicated hardware. Programs for executing the function of the processor 120 are stored in the memory of the processor 120. It should be noted that the programs may be stored in external storage media and be provided therefrom. Moreover, each of the functioning units shown in FIG. 2 may be constructed of a dedicated operational circuit. The functioning unit constructed of software and the functioning unit constructed of a dedicated operational circuit may be used together. For example, each of the functioning units shown in FIG. 2 can be formed of an electronic circuit such as a CPU (Central Processing Unit), an ASIC (Application Specific Integrated Circuit), a PLD (Programmable Logic Device) such as a FPGA (Field Programmable Gate Array), or the like.

Whether each of the functioning units is constructed of dedicated hardware or is constructed of software that is executed by a program in a CPU is selected in consideration of required processing speed, production cost, consumption amount of electric power, etc. For example, when a particular functioning unit is constructed of a FPGA, the processing speed is superior, but the production cost is high. On the other hand, when a particular functioning unit is constructed of software executed by a program in a CPU, materials for hardware are conserved, whereby the production cost is improved. However, in such cases of executing the function of the functioning unit by the CPU, the processing speed is inferior when compared with that in cases of using dedicated hardware. In addition, when the function of the functioning unit is executed by the CPU, there may be cases in which complicated calculations cannot be performed. The type of the functioning unit constructed of dedicated hardware and the type of the functioning unit constructed of software have the above differences, but these are equivalent in capability of performing a specific function.

The processor 120 includes a laser scan data obtaining unit 121, an image data obtaining unit 122, a reference point cloud position data calculator 123, a matching point selecting unit 124, an exterior orientation parameter calculator 125, and a trajectory calculator 127. Although not shown in the figures, the processor 120 has a function of integrally processing image data and laser scan data and obtaining three-dimensional data of conditions around the vehicle 100 as it travelled. By using the three-dimensional data, a three-dimensional model of the conditions, in which the vehicle 100 has travelled, can be generated.

The laser scan data obtaining unit 121 obtains laser scan data measured by the laser scanner 115. The laser scan data obtained by the laser scan data obtaining unit 121 includes reference laser scan data. The reference laser scan data is laser scan data for performing calibration of the camera 113. In this example, laser scan data, in which a building 131 is the scan object (measured object), is used as the reference laser scan data. In addition, the laser scan data obtaining unit 121 also obtains scan data in addition to the reference laser scan data.

The image data obtaining unit 122 obtains data of an image photographed by the camera 113. For example, in a case in which the camera 113 photographed a moving image, the data of the moving image is obtained by the image data obtaining unit 122. The image data obtaining unit 122 obtains data of a comparative image used for calculating the exterior orientation parameters of the camera 113. The comparative image is a photographed image of a portion that includes the scan object (in this example, the building 131) relating to the reference laser scan data. In addition, the image data obtaining unit 122 also obtains data of images besides the comparative image.

The reference point cloud position data calculator 123 generates reference point cloud position data based on the reference scan data measured by the laser scanner 115. The reference point cloud position data is obtained by converting the coordinate system of the reference laser scan data into the IMU coordinate system (coordinate system defined on the IMU 114 and having the position of the IMU 114 as an origin point) at time t when the camera 113 photographed the comparative image.

Since the reference laser scan data is obtained while the vehicle 100 travels, the position of the viewpoint (location of the laser scanner 115) at the time when each point is obtained differs, and a coordinate system describing each point also differs. Accordingly, by performing calculation for reevaluating this reference laser scan data by the IMU coordinate system (coordinate system having the position of the IMU 114 as an origin point) at time t when the camera 113 photographed the comparative image, the reference point cloud position data is obtained. This processing is performed by the reference point cloud position data calculator 123.

The matching point selecting unit 124 selects points (common points) that match between feature points in the reference point cloud position data and feature points in the comparative image photographed by the camera 113. For example, reference point cloud position data relating to the building 131, which is described in the IMU coordinate system at a particular time t, is displayed on the left side of an appropriate display (for example, a display of a personal computer). At this time, the appearance of the building 131 is displayed by a set of dot-like bright points. On the other hand, an image of the building 131 photographed by the camera 113 at time t is displayed on the right side of the display.

In this case, the two images showing the appearance of the building 131, which are viewed from slightly different locations on the vehicle 100, are displayed on the display. Here, the displayed image on the left side is a point group image constructed of the bright points, whereas the displayed image on the right side is a photographic image.

The matching point selecting unit 124 selects feature points that are in common in the two images. As the method for selecting the matching points, a method of performing the selection by a user, a method of extracting candidate points by software processing and selecting matching points therefrom by a user, or a method of performing the selection automatically by software processing, may be described.

The minimum number of the matching points selected by the matching point selecting unit 124 differs depending on the method used for orientation. For example, in a case of using a single orientation, at least four matching points are selected. On the other hand, for example, in a case of using a DLT method, at least six matching points are selected. Naturally, matching points of more than each of these minimum numbers can be selected.

The exterior orientation parameter calculator 125 calculates exterior orientation parameters of the camera 113 based on three-dimensional coordinates (three-dimensional coordinates in the IMU coordinate system) of the feature points selected by the matching point selecting unit 124 and based on image coordinate values of the matching points in the comparative image selected by the matching point selecting unit 124. This processing is performed by the single orientation or the DLT method.

The trajectory calculator 127 calculates the trajectory the vehicle 100 has travelled, based on a ground coordinate system. As the method for calculating the trajectory of the vehicle 100, a method based on outputs from the IMU 114 and the GNSS unit 111 may be described. In addition, as the processing performed by the trajectory calculator 127, a processing for calculating the trajectory of the vehicle 100 based on the outputs of the IMU 114 and the GNSS unit 111 and output from an exterior device may also be performed.

Alternatively, a processing for calculating the travelled trajectory of the vehicle 100 from moving images photographed from the moving vehicle 100 may also be performed by the trajectory calculator 127. Such technique is disclosed in, for example, Japanese Unexamined Patent Application Laid-Open No. 2013-186816. In this case, a processing for calculating locations of the vehicle 100 that constantly changed (that is, the trajectory of the vehicle 100) is performed by the trajectory calculator 127 by using photographic images taken by the camera 113.

Moreover, the trajectory of the vehicle 100 can also be measured by a device installed outside, such as a total station. The total station emits laser light on an object to be measured, and it constantly measures distance and direction to the object and thereby measures the travelled trajectory of the object.

Example of Processing

A detailed example of a procedure of a processing for obtaining the exterior orientation parameters of the camera 113 will be described hereinafter. First, a vehicle 100 equipped with the measuring system 110 is prepared (refer to FIG. 1). In this stage, the position and the attitude of the measuring system 110 with respect to the vehicle 100, the position and the attitude of the IMU 114 on the measuring system 110, the position (position of an antenna part) of the GNSS unit 111 with respect to the IMU 114, and the position and the attitude of the laser scanner 115 with respect to the IMU 114 are preliminarily measured and obtained. On the other hand, the exterior orientation parameters with respect to the IMU 114 (position and attitude with respect to the IMU 114) of the camera 113 are still not obtained.

After the vehicle 100 equipped with the measuring system 110 is prepared, travel of the vehicle 100 on an appropriate calibration course 130 is started. The calibration course 130 is preferably a linear course having conditions such that an object to be measured, in which feature points are easily obtained therefrom, such as the building 131, can be scanned with laser light and be photographed.

Figure 3:
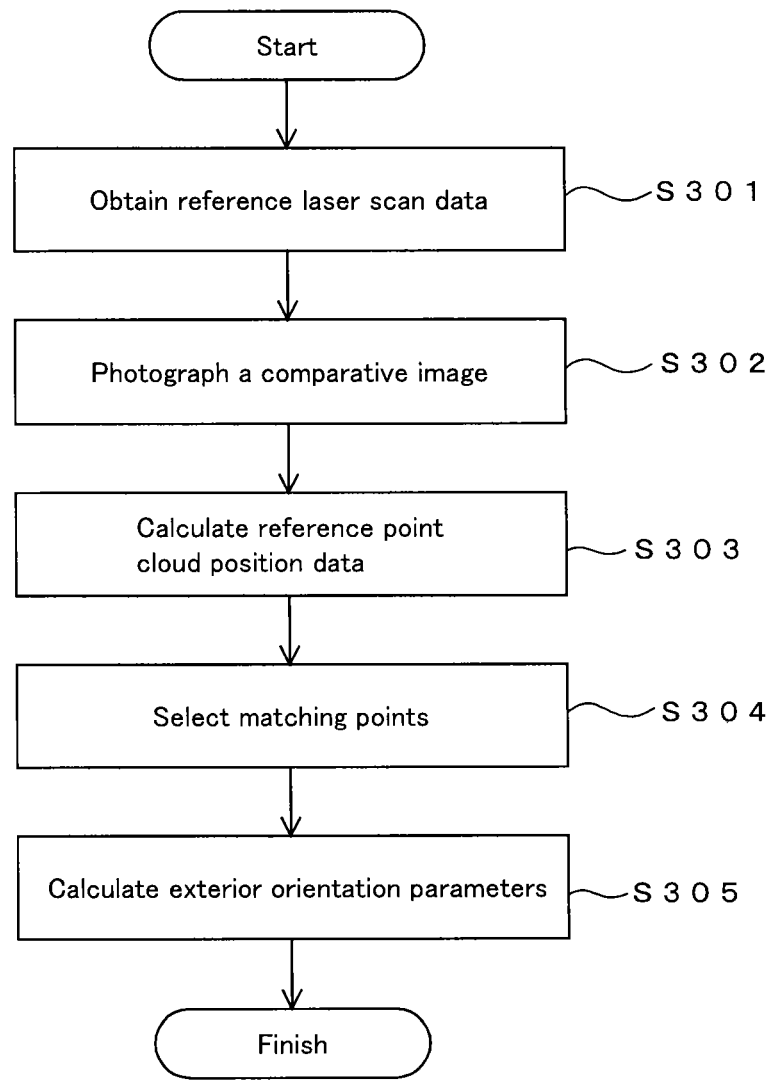
FIG. 3 is a flow chart showing an example of a procedure of processing.

An example of the procedure of the processing is shown in FIG. 3. The programs for executing the procedure of the processing shown in FIG. 3 are stored in a memory area in the processor 120. It should be noted that the programs may be stored in external storage media and be provided therefrom.

The processing shown in FIG. 3 can be performed while the vehicle 100 travels on the calibration course 130. Naturally, after the reference laser scan data and the comparative image are obtained, the processing of step S303 and the subsequent steps can be performed at an appropriate later timing.

After the processing is started, the building 131 is scanned with laser light by the laser scanner 115 while the vehicle 100 travels on the calibration course 130 (step S301). By this step, reference laser scan data is obtained.

In addition, a moving image of the building 131 is photographed by the camera 113 at an appropriate timing while the laser scanning is performed (step S302). By this moving image photographing, comparative images are obtained. In this case, a frame image at an appropriate timing in the moving image is used as the comparative image. Alternatively, one or more still images may be taken instead of photographing the moving image.

Next, the coordinates of the reference laser scan data are converted, whereby reference point cloud position data is obtained (step S303). This processing is performed by the reference point cloud position data calculator 123. The details of the processing performed in the step S303 will be described below.

Figure 4:
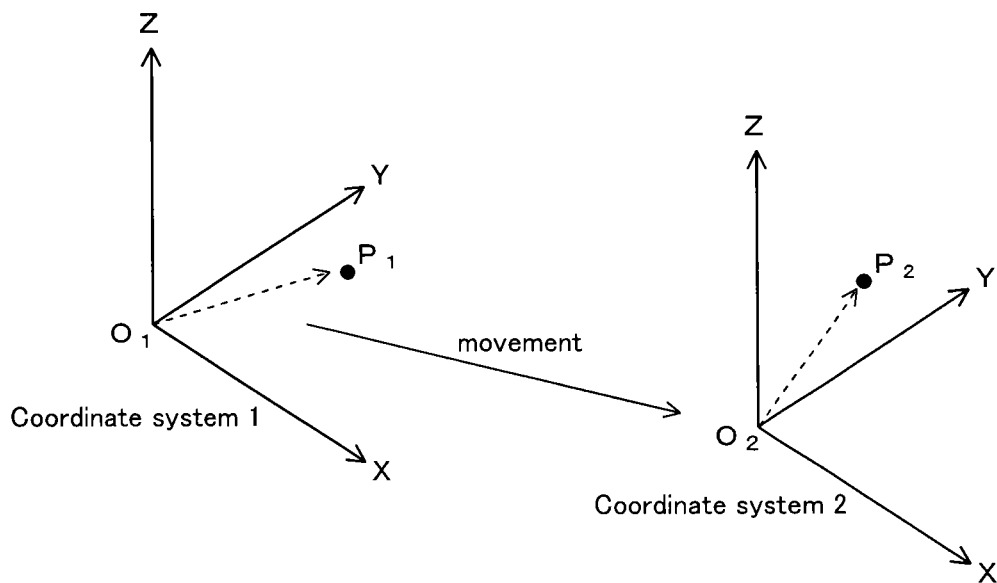
FIG. 4 is an explanatory diagram relating to reference laser scan data.

The reference laser scan data is obtained by the laser scanning while travelling. Therefore, the origin point (viewpoint) of the reference laser scan data obtained by the laser scanner 115 is constantly changing. FIG. 4 shows an exaggerated positional relationship between scan points $P_1$ and $P_2$ of the reference laser scan data. FIG. 4 shows a case in which the scan point $P_1$ is obtained prior to obtaining the scan point $P_2$ while the laser scanner 115 moves from a position $O_1$ to a position $O_2$.

In the case shown in FIG. 4, there is a positional relationship between the scan point $P_1$ obtained at the position $O_1$ and the scan point $P_2$ obtained at the position $O_2$. Here, since the positions $O_1$ and $O_2$ differ from each other, a coordinate system 1 and a coordinate system 2 for describing the two scan points, respectively, are not the same.

Accordingly, the coordinate systems of the scan points $P_1$ and $P_2$ are integrated according to the following principle. First, the trajectory data of the vehicle 100 in the ground coordinate system is obtained while the reference laser scan data is obtained. The trajectory data of the vehicle 100 in the ground coordinate system can be obtained by measurement by the IMU 114 or by automatically tracking the vehicle 100 by a total station in which the exterior orientation parameters are already known. According to the trajectory of the vehicle 100, the position and the attitude of the vehicle 100 at each time are determined.

On the other hand, since the laser scanner 115 is provided with the reference time from the GNSS unit 111, each scan point is linked with the time when it is obtained, in the reference laser scan data. In the case shown in FIG. 4, the coordinate data of the scan point $P_1$ linked with the time when the scan point $P_1$ is obtained is included in the reference laser scan data.

Since the vehicle 100 passed the positions $O_1$ and $O_2$, the relative relationships (positional relationship and directional relationship) between the coordinate systems 1 and 2 in FIG. 4 are determined from the trajectory data of the vehicle 100 based on the time. According to the relative relationships (positional relationship and directional relationship) between the coordinate systems 1 and 2, the manners of moving the coordinate system 2 parallel and further rotating it so that the coordinate system 2 is converted into the coordinate system 1 can be known.

Accordingly, the coordinate system of the scan point $P_2$ is converted into the coordinate system 1 based on the trajectory data of the vehicle 100. That is, the scan point $P_2$ can be described based on the coordinate system 1. According to this principle, assuming that time the camera 113 photographed a comparative image is represented as $t_1$, the coordinate system of each point of the reference laser scan data is converted into the IMU coordinate system at time $t_1$, whereby reference point cloud position data is obtained.

The First Formula shows the i-th reference point cloud position data ($P_{imu}(i)$) in the IMU coordinate system at a time when the camera 113 photographed the k-th frame image.

$$P_{imu}(i) = \text{AttIMU}_{world}(k)^{-1} \cdot P_{world}(i) - \text{PosIMU}_{world}(k) \quad \text{First Formula}$$

(1) $\text{AttIMU}_{world}(k)$: Attitude of the IMU in the ground coordinate system at a time when the k-th frame image is photographed $\text{AttIMU}_{world}(k)^{-1}$: Inverse matrix of $\text{AttIMU}_{world}(k)$ (2) $P_{world}(1 \ldots m)$: Reference point cloud position data described in the ground coordinate system (m points)

(3) $\text{PosIMU}_{world}(k)$: Position of the IMU in the ground coordinate system at a time when the k-th frame image is photographed The values of (1) and (3) are obtained from the trajectory data of the vehicle 100. The value of (2) is obtained from the reference laser scan data and the trajectory data of the vehicle 100. That is, since the trajectory data of the vehicle 100 is described in the ground coordinate system, the value of (2) is obtained by converting the coordinate system of each point of the reference laser scan data into the ground coordinate system based on the trajectory data of the vehicle 100. The calculation of the First Formula is performed by the reference point cloud position data calculator 123.

After the calculation of the reference point cloud position data is performed in the step S303, matching points are selected (step S304). This processing is performed by the matching point selecting unit 124. In order to select the matching points, a method of selecting them by a user while the user views displayed images may be described, but a method of extracting feature points by software and numerically evaluating the feature points, can also be performed. In this case, matching points are automatically selected by software.

The selection of the matching points can be performed by using one frame, but can be performed by using plural frames. For example, the following processing may be performed. First, first matching points are selected between a first comparative image photographed at time $t_1$ by the camera 113 and first reference point cloud position data, which is obtained by converting the coordinate system of each point of the reference laser scan data into the IMU coordinate system at time $t_1$. Then, second matching points are selected between a second comparative image photographed at time $t_2$ by the camera 113 and second reference point cloud position data, which is obtained by converting the coordinate system of each point of the reference laser scan data into the IMU coordinate system at time $t_2$. Furthermore, third matching points are selected between a third comparative image photographed at time $t_3$ by the camera 113 and third reference point cloud position data, which is obtained by converting coordinate system of each point of the reference laser scan data into the IMU coordinate system at time $t_3$.

After the matching points are selected, exterior orientation parameters of the camera 113 are calculated (step S305). This processing is performed by the exterior orientation parameter calculator 125. The details of the processing for calculating the exterior orientation parameters of the camera 113 will be described as follows.

Figure 5:
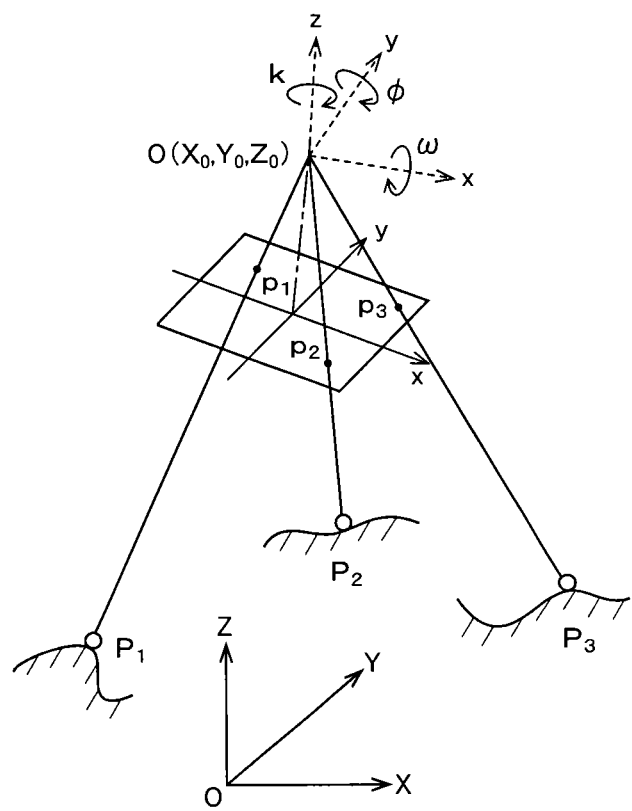
FIG. 5 is an explanatory diagram for explaining resection method.

FIG. 5 is an explanatory diagram for explaining resection method. The resection method is a method of observing directions from an unknown point O to at least three known points $P_1$, $P_2$, and $P_3$ and calculating the position of the unknown point O as the intersection point of these directional lines. Here, exterior orientation parameters $(X_0, Y_0, Z_0, \omega, \varphi, \kappa)$ of the camera 113, which photographed the comparative image, are calculated by the resection method by assuming the matching points selected in the step S304 as reference points $P_1$, $P_2$, and $P_3$ in FIG. 5. Here, as the resection method, a single orientation and a DLT method will be described.

First, a case of calculating the exterior orientation parameters $(X_0, Y_0, Z_0, \omega, \varphi, \kappa)$ of the camera 113 by the single orientation will be described. The single orientation is a method of calculating a position O $(X_0, Y_0, Z_0)$ and an attitude $(\omega, \varphi, \kappa)$ of the camera that photographed images by using a collinearity condition formed on reference points in a photograph. The collinearity condition is a condition in which a projection center O, a photographic image $(p_1, p_2, p_3)$, and objective points (in this case, the matching points) $(Op_1P_1, Op_2P_2, Op_3P_3)$ are on one straight line. Here, the position O $(X_0, Y_0, Z_0)$ and the attitude $(\omega, \varphi, \kappa)$ of the camera are exterior orientation parameters of the camera 113 in FIG. 1.

First, the camera coordinate system is assumed to be (x, y, z), the photographic coordinate system is assumed to be (x, y), and the reference coordinate system of the coordinate system for an object to be measured is assumed to be (X, Y, Z). In this case, the photographic coordinate system is the coordinate system of the comparative image, and the reference coordinate system is the IMU coordinate system.

Then, it is assumed that photographs are taken by turning the camera to the left by $\omega$, $\varphi$, $\kappa$ with respect to the positive direction in each coordinate axis in series. Next, three-dimensional coordinates of reference points corresponding to image coordinate values of four matching points (only three points are shown in FIG. 5), which are selected in the step S304, are obtained. The image coordinate values are coordinate values (x value and y value) in the comparative image on the display, and the three-dimensional coordinates of the reference points are obtained from the reference point cloud position data. These image coordinate values and these three-dimensional coordinates of the reference point are substituted for 2-D projective transformation represented by the following Second Formula. Then, observation equations are made, and thereby parameters b1 to b8 are calculated.

$$X = \frac{b1 \cdot x + b2 \cdot y + b3}{b7 \cdot x + b8 \cdot y + 1} \qquad \text{Second Formula}$$

$$Y = \frac{b4 \cdot x + b5 \cdot y + b6}{b7 \cdot x + b8 \cdot y + 1}$$

X,Y: Reference point coordinates x,y: Photographic coordinates

By using the parameters b1 to b8 in the Second Formula, exterior orientation parameters $(X_0, Y_0, Z_0, \omega, \varphi, \kappa)$ are calculated from the following Third Formula. Here, the symbols $(X_0, Y_0, Z_0)$ represent the position of the camera 113 with respect to the IMU 114, and the symbols $(\omega, \varphi, \kappa)$ represent the attitude of the camera 113 with respect to the IMU 114.

$\omega = \tan^{-1}(C \cdot b8)$ $\varphi = \tan^{-1}(-C \cdot b7 \cdot \cos \omega)$ $\kappa = \tan^{-1}(-b4/b1)(\varphi=0)$ $\kappa = \tan^{-1}(-b2/b5)(\varphi \neq 0, \omega=0)$ $\kappa = \tan^{-1}\{-(A1 \cdot A3 - A2 \cdot A4)/(A1 \cdot A2 - A3 \cdot A4)\}(\varphi \neq 0, \omega \neq 0)$ $X_0 b3 - (\tan \omega \cdot \sin \kappa/\cos \varphi - \tan \varphi \cdot \cos \kappa) \times (Zm - Z_0)$ $Y_0 b = 6 - (\tan \omega \cdot \cos \kappa/\cos \varphi - \tan \varphi \cdot \sin \kappa) \times (Zm - Z_0)$ $Z_0 = C \cdot \cos \omega \{(A2^2 + A3^2)/(A1^2 + A4^2)\}^{1/2} + Zm$     Third Formula Here,
$A1 = 1 + \tan^2 \varphi$
$A2 = B1 + B2 \cdot \tan \varphi / \sin \omega$
$A3 = B4 + B5 \cdot \tan / \sin \omega$
$A4 = \tan \varphi / (\cos \varphi \cdot \tan \omega)$ Zm: Average elevation of four reference points (here, four reference points are coordinates on the same plane, so the elevation is assumed to be fixed.)

C: Focal length

As described above, matching points that are common feature points between the reference point cloud position data and the comparative image are selected, and then the single orientation is performed, whereby the exterior orientation parameters of the camera 113 are calculated.

Next, a procedure for calculating the exterior orientation parameters of the camera 113 by the DLT method will be described. The DLT method approximates a relationship between photographic coordinates and three-dimensional coordinates of an objective space by using 3-D projective transformation. The basic formula of the DLT method is as in the following Fourth Formula. The details of the DLT method may be found in "Shunji Murai: Analytical Photogrammetry, pages 46 to 51 and 149 to 155", etc.

$$x = \frac{L_1 X + L_2 Y + L_3 Z + L_4}{L_9 X + L_{10} Y + L_{11} Z + 1}$$

$$y = \frac{L_5 X + L_6 Y + L_7 Z + L_8}{L_9 X + L_{10} Y + L_{11} Z + 1}$$

Fourth Formula (x,y): Photographic coordinates
(X,Y,Z): Three-dimensional coordinates of an objective space
$L_1$ to $L_{11}$: Unknown variables in the DLT method By deleting the denominator in the Fourth Formula, a linear formula of the Fifth Formula is derived.

$$XL_1 + YL_2 + ZL_3 + L_4 - xXL_9 - xZL_{11} = x$$

$$XL_5 + YL_6 + ZL_7 + L_8 - yXL_9 - yYL_{10} - yZL_{11} = y$$

Fifth Formula

Moreover, the Fifth Formula is transformed, whereby the following Sixth Formula is obtained.

Sixth Formula $$\begin{vmatrix} X & Y & Z & 1 & 0 & 0 & 0 & 0 & -xX & -xY & -xZ \\ 0 & 0 & 0 & 0 & X & Y & Z & 1 & -yX & -yY & -yZ \end{vmatrix} \begin{vmatrix} L_1 \\ L_2 \\ L_3 \\ L_4 \\ L_5 \\ L_6 \\ L_7 \\ L_8 \\ L_9 \\ L_{10} \\ L_{11} \end{vmatrix} = \begin{vmatrix} x \\ y \end{vmatrix}$$

Three-dimensional coordinates and image coordinate values (photographic coordinates) in the comparative image of at least six matching points (X, Y, Z) are substituted for the Sixth Formula. Then, the Sixth Formula is solved by using the least-squares method, whereby eleven unknown variables from $L_1$ to $L_{11}$ are obtained. The $L_1$ to $L_{11}$ include the exterior orientation parameters (position and attitude with respect to the IMU 114) of the camera 113. Therefore, by calculating the values of $L_1$ to $L_{11}$ the exterior orientation parameters of the camera 113 are obtained. Thus, the exterior orientation parameters of the camera 113 are calculated by the DLT method.

According to the embodiment, even when the mounted position and attitude of the camera 113 are not clear, by performing laser scanning by the laser scanner 115 and by performing photographing by the camera 113 while the vehicle 100 travels on the calibration course 130, the exterior orientation parameters of the camera 113 are calculated. In particular, it is not necessary to specially set a calibration course 130, and an ordinary road can be used, whereby the exterior orientation parameters of the camera 113 can be calculated in a simple manner. Therefore, for example, even in a case in which the camera 113 was mounted by a user, or even in a case in which the position and the attitude of the camera 113 were changed, the exterior orientation parameters of the camera 113 can be calculated in a simple manner.

In a case of using plural frames, matching points are selected between the comparative image and the reference point cloud position data in each of the frames. Then, the data of the matching points selected in each of the frames are superposed, whereby superposed matching point data is obtained. By using this superposed matching point data, the exterior orientation parameters are calculated by the resection method or the DLT method, described above.

For example, in the following case, the following processing is performed. Initially, first matching points are selected between a first comparative image photographed at time $t_1$ by the camera 113 and first reference point cloud position data, which is obtained by converting the coordinates of each point of the reference laser scan data into the IMU coordinate system at time $t_1$. Then, second matching points are selected between a second comparative image photographed at time $t_2$ by the camera 113 and second reference point cloud position data, which is obtained by converting the coordinates of each point of the reference laser scan data into the IMU coordinate system at time $t_2$. Furthermore, third matching points are selected between a third comparative image photographed at time $t_3$ by the camera 113 and third reference point cloud position data, which is obtained by converting the coordinates of each point of the reference laser scan data into the IMU coordinate system at time $t_3$.

In this case, the data of the first matching points selected between the first comparative image and the first reference point cloud position data, the data of the second matching points selected between the second comparative image and the second reference point cloud position data, and the data of the third matching points selected between the third comparative image and the third reference point cloud position data are superposed, whereby superposed matching point data are obtained. This superposed matching point data is formed of superposed matching point data of the comparative images, in which the matching points in the first to the third comparative images are superposed, and superposed matching point data of the reference point cloud position data, in which the matching points of the first to the third reference point cloud position data are superposed. Then, the exterior orientation parameters of the camera 113 are calculated by the resection method or the DLT method by using the superposed matching point data of the comparative images and the superposed matching point data of the reference point cloud position data.

Specifically, by using image coordinate values (coordinate values in the images photographed by the camera 113) of the superposed matching points in the comparative images and three-dimensional coordinate values of the superposed matching points of the reference point cloud position data, the exterior orientation parameters of the camera 113 are calculated by the resection method or the DLT method. According to this processing, matching points, which are obtained from various viewpoints, are used, whereby the calculation precision of the exterior orientation parameters can be improved.

As another method, in a case of selecting matching points in plural frames, a method of calculating the exterior orientation parameters of the camera 113 in each of the frames and adapting an average value or a center value within a particular deviation range of the calculated plural exterior orientation parameters, can also be performed.

Other Matters

Figure 2:
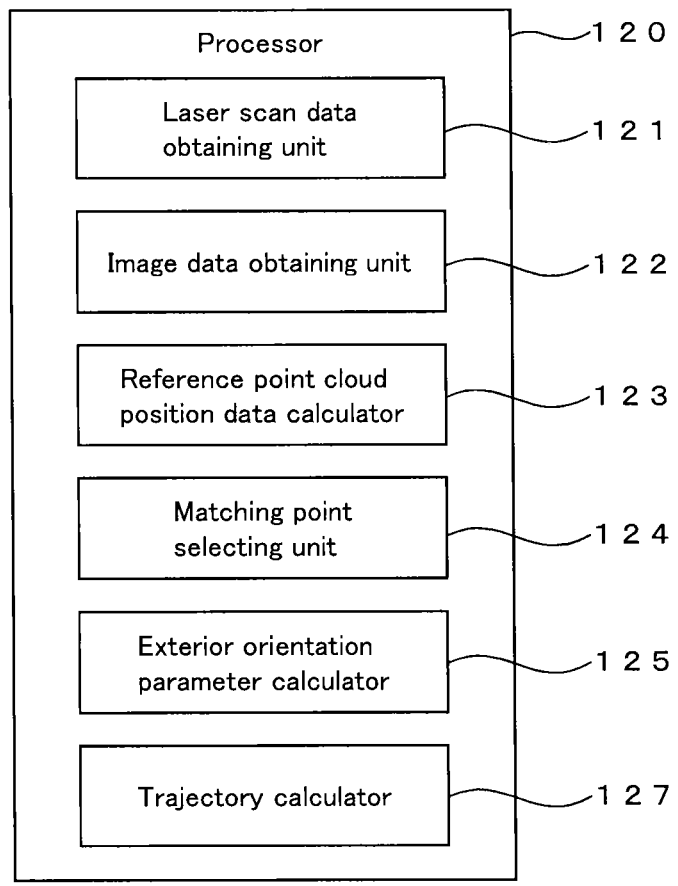
FIG. 2 is a block diagram of a processor.

One or more of the functioning units of the processor 120 shown in FIG. 2 may be constructed of separate hardware and then be connected by an appropriate communication means so as to perform the function of the processor 120 as a system. For example, an exterior device (personal computer or dedicated computer) for executing a part of the functions of the processor 120 may be connected with the processor 120, whereby a structure, in which some of the functions of the processor 120 are performed by the exterior device, can be formed.

In the above example, a case for calculating the exterior orientation parameters of the camera 113 by photographing a comparative image by using the camera 113, in which the exterior orientation parameters with respect to the IMU 114 are not determined, is described. However, in a condition in which exterior orientation parameters of the camera 113 containing margins of error are already determined (or set), the exterior orientation parameters of the camera 113 can be calculated in the same manner as described above.

The calibration course 130 can be fixed by using rails or the like. Thus, the trajectory of the vehicle 100 on the calibration course 130 can be obtained with greater precision.

The obtaining of the reference point cloud position data and the photographing of the comparative image can be performed by using a marker or a target, which can easily be a feature point, as an object to be measured.

In recent years, technology for performing automatic driving or assisted driving of a vehicle by obtaining three-dimensional information surrounding the vehicle has been publicly known. The present invention can be utilized for calibrating an onboard camera in cases of using the onboard camera for this technology.

The present invention can be utilized for techniques of determining exterior orientation parameters of cameras.

What is claimed is:

1. An operating device that calculates unknown exterior orientation parameters of a camera with respect to a vehicle on which the camera is fixed, by using laser scan data obtained by a laser scanner that is fixed on the vehicle and that has determined exterior orientation parameters with respect to the vehicle, the operating device comprising:

a reference laser scan data obtaining circuit having a structure that obtains laser scan data, which is obtained by scanning an object to be measured with laser light by the laser scanner while the vehicle travels, as reference laser scan data;

an image data obtaining circuit having a structure that obtains data of an image of the object, which is photographed at a predetermined timing by the camera with unknown exterior orientation parameters with respect to the vehicle, while the vehicle travels;

a processor programmed to perform as a reference point cloud position data calculator that calculates reference point cloud position data, in which the reference laser scan data is described in a coordinate system defined on the vehicle at the predetermined timing, based on a trajectory the vehicle has travelled;

a matching point selecting circuit having a structure that selects matching points between the reference point cloud position data and the image; and the processor further programmed to perform as an exterior orientation parameter calculator that calculates the unknown exterior orientation parameters of the camera with respect to the vehicle based on the reference point cloud position data of the matching points and image coordinate values of the matching points in the image, wherein the image data obtaining circuit obtains data of a first comparative image and a second comparative image that are respectively photographed at time $t_1$ and $t_2$ while the vehicle travels, the reference point cloud position data calculates first reference point cloud position data and second reference point cloud position data, which are respectively described in a coordinate system defined on the vehicle at the time $t_1$ and $t_2$, from the reference laser scan data on the basis of the trajectory of the vehicle, the matching point selecting circuit selects matching points between the first comparative image and the first reference point cloud position data and between the second comparative image and the second reference point cloud position data, and the exterior orientation parameter calculator calculates, based on image coordinate values of the matching point in the first comparative image and the matching point in the second comparative image and based on the matching point in the first reference point cloud position data and the matching point in the second reference point cloud position data, first exterior orientation parameters, second exterior orientation parameters, and an average of the first exterior orientation parameters and the second exterior orientation parameters or a center value in a predetermined deviation range of the first exterior orientation parameters and the second exterior orientation parameters, the first exterior orientation parameters are unknown exterior orientation parameters of the camera with respect to the vehicle in the first comparative image, and the second exterior orientation parameters are unknown exterior orientation parameters of the camera with respect to the vehicle in the second comparative image.

2. The operating device according to claim 1, wherein the exterior orientation parameter calculator calculates the exterior orientation parameters by a single orientation or a DLT method using image coordinate values of superposed matching point data in a comparative image in which the matching point in the first comparative image and the matching point in the second comparative image are superposed and superposed matching point data of reference point cloud position data in which the matching point in the first reference point cloud position data and the matching point in the second reference point cloud position data are superposed.

3. The operating device according to claim 2, wherein the exterior orientation calculator calculates the exterior orientation parameters by the single orientation method based on a FIRST FORMULA and a SECOND FORMULA, wherein the FIRST FORMULA is:

$$X = \frac{b1 \cdot x + b2 \cdot y + b3}{b7 \cdot x + b8 \cdot y + 1}$$

$$Y = \frac{b4 \cdot x + b5 \cdot y + b6}{b7 \cdot x + b8 \cdot y + 1}$$

X,Y: Reference point coordinates x,y: Photographic coordinates and wherein the SECOND FORMULA is $$\omega = \tan^{-1}(C \cdot b8)$$

$$\phi = \tan^{-1}(-C \cdot b7 \cdot \cos \omega)$$

$\kappa = \tan^{-1}(-b4/b1)(\phi=0)$ $\kappa = \tan^{-1}(-b2/b5)(\phi\neq0,\omega=0)$ $\kappa = \tan^{-1}\{-(A1\cdot A3-A2\cdot A4)/(A1\cdot A2-A3\cdot A4)\}(\phi\neq0,\omega\neq0)$ $X_0 = b3 - (\tan\omega\sin\kappa/\cos\phi - \tan\phi\cdot\cos\kappa)\times(Zm-Z_0)$ $Y_0 = b6 - (\tan\omega\sin\kappa/\cos\phi - \tan\phi\cdot\sin\kappa)\times(Zm-Z_0)$ $Z_0 = C\cdot\cos\omega\{(A2^2+A3^2)/(A1^2+A4^2)\}^{1/2} + Zm$ Here,
A1 = 1 + $\tan^2(\phi)$
A2 = B1 + B2·tan $\phi$/sin $\omega$
A3 = B4 + B5·tan $\phi$/sin $\omega$
A4 = tan $\phi$/(cos $\phi$·tan $\omega$)
Zm: Average elevation of four reference points (here, four reference points are coordinates on the same plane so the elevation is assumed to be fixed)
C: Focal length.

4. The operating device according to claim 2, wherein the exterior orientation calculator calculates the exterior orientation parameters by the DLT method based on a THIRD FORMULA, wherein the THIRD FORMULA is $$x = \frac{L_1\cdot X + L_2\cdot Y + L_3\cdot Z + L_4}{L_9\cdot X + L_{10}\cdot Y + L_{11}\cdot Z + 1}$$

$$y = \frac{L_5\cdot X + L_6\cdot Y + L_7\cdot Z + L_8}{L_9\cdot X + L_{10}\cdot Y + L_{11}\cdot Z + 1}$$

(x,y): Photographic coordinates
(X,Y,Z): Three-dimensional coordinates of an objective space
$L_1$ to $L_{11}$: Unknown variables in the DLT method.

5. An operating method for calculating unknown exterior orientation parameters of a camera with respect to a vehicle on which the camera is fixed, by using laser scan data obtained by a laser scanner that is fixed on the vehicle and that has determined exterior orientation parameters with respect to the vehicle, the method comprising:
obtaining laser scan data, which is obtained by scanning an object to be measured with laser light by the laser scanner while the vehicle travels, as reference laser scan data;
obtaining data of an image of the object, which is photographed at a predetermined timing by the camera while the vehicle travels;
calculating reference point cloud position data, in which the reference laser scan data is described in a coordinate system defined on the vehicle at the predetermined timing, based on a trajectory the vehicle has traveled;
selecting matching points between the reference point cloud position data and the image; and
calculating the unknown exterior orientation parameters of the camera with respect to the vehicle based on the reference point cloud position data of the matching points and image coordinate values of the matching points in the image,
wherein the obtaining data of an image of the object obtains data of a first comparative image and a second comparative image that are respectively photographed at time $t_1$ and $t_2$ while the vehicle travels,
the calculating reference point cloud position data calculates first reference point cloud position data and second reference point cloud position data, which are respectively described in a coordinate system defined on the vehicle at the time $t_1$ and $t_2$, from the reference laser scan data on the basis of the trajectory of the vehicle,
the selecting matching points selects matching points between the first comparative image and the first reference point cloud position data and between the second comparative image and the second reference point cloud position data, and
the calculating the unknown exterior orientation parameters of the camera with respect to the vehicle calculates, based on image coordinate values of the matching point in the first comparative image and the matching point in the second comparative image and based on the matching point in the first reference point cloud position data and the matching point in the second reference point cloud position data, first exterior orientation parameters, second exterior orientation parameters, and an average of the first exterior orientation parameters and the second exterior orientation parameters or a center value in a predetermined deviation range of the first exterior orientation parameters and the second exterior orientation parameters, the first exterior orientation parameters are unknown exterior orientation parameters of the camera with respect to the vehicle in the first comparative image, and the second exterior orientation parameters are unknown exterior orientation parameters of the camera with respect to the vehicle in the second comparative image.

6. The operating method according to claim 5, wherein the calculating the exterior orientation parameters calculates the exterior orientation parameters by a single orientation or a DLT method using image coordinate values of superposed matching point data in a comparative image in which the matching point in the first comparative image and the matching point in the second comparative image are superposed and superposed matching point data of reference point cloud position data in which the matching point in the first reference point cloud position data and the matching point in the second reference point cloud position data are superposed.

7. The operating method according to claim 6, wherein the calculating the exterior orientation parameters by the single orientation method includes calculating the exterior orientation parameters based on a FIRST FORMULA and a SECOND FORMULA,
wherein the FIRST FORMULA is:

$$X = \frac{b1\cdot x + b2\cdot y + b3}{b7\cdot x + b8\cdot y + 1}$$

$$Y = \frac{b4\cdot x + b5\cdot y + b6}{b7\cdot x + b8\cdot y + 1}$$

X,Y: Reference point coordinates x,y: Photographic coordinates
and wherein the SECOND FORMULA is $\omega = \tan^{-1}(C\cdot b8)$ $\phi = \tan^{-1}(-C\cdot b7\cdot\cos\omega)$ $\kappa = \tan^{-1}(-b4/b1)(\phi=0)$ $\kappa = \tan^{-1}(-b2/b5)(\phi\neq0,\omega=0)$ $\kappa = \tan^{-1}\{-(A1\cdot A3-A2\cdot A4)/(A1\cdot A2-A3\cdot A4)\}(\phi\neq0,\omega\neq0)$ $X_0 = b3 - (\tan \omega \sin \kappa/\cos \phi - \tan \phi \cdot \cos \kappa) \times (Zm - Z_0)$ $Y_0 = b6 - (\tan \omega \sin \kappa/\cos \phi - \tan \phi \sin \kappa) \times (Zm - Z_0)$ $Z_0 = C \cdot \cos \omega \{(A2^2 + A3^2)/(A1^2 + A4^2)\}^{1/2} + Zm$ Here,
  $A1 = 1 + \tan^2(\phi)$
  $A2 = B1 + B2 \cdot \tan \phi / \sin \omega$
  $A3 = B4 + B5 \cdot \tan \phi / \sin \omega$
  $A4 = \tan \cap / (\cos \cap \cdot \tan \omega)$
  Zm: Average elevation of four reference points (here, four reference points are coordinates on the same plane so the elevation is assumed to be fixed)
  C: Focal length.

8. The operating method according to claim 6, wherein the calculating the exterior orientation parameters by the DLT method includes calculating the exterior orientation parameters based on a THIRD FORMULA, wherein the THIRD FORMULA is $$x = \frac{L_1 \cdot X + L_2 \cdot Y + L_3 \cdot Z + L_4}{L_9 \cdot X + L_{10} \cdot Y + L_{11} \cdot Z + 1}$$

$$y = \frac{L_5 \cdot X + L_6 \cdot Y + L_7 \cdot Z + L_8}{L_9 \cdot X + L_{10} \cdot Y + L_{11} \cdot Z + 1}$$

(x,y): Photographic coordinates
(X,Y,Z): Three-dimensional coordinates of an objective space
$L_1$ to $L_{11}$: Unknown variables in the DLT method.

9. A non-transitory computer storage medium storing a program to be read and executed by a computer for calculating unknown exterior orientation parameters of a camera with respect to a vehicle on which the camera is fixed, by using laser scan data obtained by a laser scanner that is fixed on the vehicle and that has determined exterior orientation parameters with respect to the vehicle, the program allowing the computer to:
  obtain laser scan data, which is obtained by scanning an object to be measured with laser light by the laser scanner while the vehicle travels, as reference laser scan data,
  obtain data of an image of the object, which is photographed at a predetermined timing by the camera while the vehicle travels,
  calculate reference point cloud position data, in which the reference laser scan data is described in a coordinate system defined on the vehicle at the predetermined timing,
  select matching points between the reference point cloud position data and the image, and
  calculate the unknown exterior orientation parameters of the camera with respect to the vehicle based on the reference point cloud position data of the matching points and image coordinate values of the matching points in the image,
wherein the step to obtain data of an image of the object obtains data of a first comparative image and a second comparative image that are respectively photographed at time $t_1$ and $t_2$ while the vehicle travels,
the step to calculate reference point cloud position data calculates first reference point cloud position data and second reference point cloud position data, which are respectively described in a coordinate system defined on the vehicle at the time $t_1$ and $t_2$, from the reference laser scan data on the basis of the trajectory of the vehicle,
the step to select matching points selects matching points between the first comparative image and the first reference point cloud position data and between the second comparative image and the second reference point cloud position data, and
the step to calculate the unknown exterior orientation parameters of the camera with respect to the vehicle calculates, based on image coordinate values of the matching point in the first comparative image and the matching point in the second comparative image and based on the matching point in the first reference point cloud position data and the matching point in the second reference point cloud position data, first exterior orientation parameters, second exterior orientation parameters, and an average of the first exterior orientation parameters and the second exterior orientation parameters or a center value in a predetermined deviation range of the first exterior orientation parameters and the second exterior orientation parameters, the first exterior orientation parameters are unknown exterior orientation parameters of the camera with respect to the vehicle in the first comparative image, and the second exterior orientation parameters are unknown exterior orientation parameters of the camera with respect to the vehicle in the second comparative image.

10. The non-transitory computer storage medium according to claim 9, wherein the step to calculate the exterior orientation parameters of the camera calculates the exterior orientation parameters by a single orientation or a DLT method using image coordinate values of superposed matching point data in a comparative image in which the matching point in the first comparative image and the matching point in the second comparative image are superposed and superposed matching point data of reference point cloud position data in which the matching point in the first reference point cloud position data and the matching point in the second reference point cloud position data are superposed.

11. The non-transitory computer storage medium according to claim 10, wherein the calculating the exterior orientation parameters by the single orientation method includes calculating the exterior orientation parameters based on a FIRST FORMULA and a SECOND FORMULA,
  wherein the FIRST FORMULA is:

$$X = \frac{b1 \cdot x + b2 \cdot y + b3}{b7 \cdot x + b8 \cdot y + 1}$$

$$Y = \frac{b4 \cdot x + b5 \cdot y + b6}{b7 \cdot x + b8 \cdot y + 1}$$

X,Y: Reference point coordinates x,y: Photographic coordinates
and wherein the SECOND FORMULA is $\omega = \tan^{-1}(C \cdot b8)$ $\phi = \tan^{-1}(-C \cdot b7 \cdot \cos \omega)$ $\kappa = \tan^{-1}(-b4/b1)(\phi = 0)$ $\kappa = \tan^{-1}(-b2/b5)(\phi \neq 0, \omega = 0)$ $\kappa = \tan^{-1}\{-(A1 \cdot A3 - A2 \cdot A4)/(A1 \cdot A2 - A3 \cdot A4)\}(\phi \neq 0, \omega \neq 0)$ $X_0 = b3 - (\tan \omega \sin \kappa / \cos \phi - \tan \phi \cdot \cos \kappa) \times (Zm - Z_0)$ $Y_0 = b6 - (\tan \omega \sin \kappa / \cos \phi - \tan \phi \cdot \sin \kappa) \times (Zm - Z_0)$ $Z_0 = C \cdot \cos \omega \{(A2^2 + A3^2)/(A1^2 + A4^2)\}^{1/2} + Zm$ Here, $A1 = 1 + \tan^2(\phi)$ $A2 = B1 + B2 \cdot \tan \phi / \sin \omega$ $A3 = B4 + B5 \cdot \tan \phi / \sin \omega$ $A4 = \tan \phi / (\cos \phi \cdot \tan \omega)$ Zm: Average elevation of four reference points (here, four reference points are coordinates on the same plane so the elevation is assumed to be fixed)

C: Focal length.

12. The non-transitory computer storage medium according to claim 10, wherein the calculating the exterior orientation parameters by the DLT method includes calculating the exterior orientation parameters based on a THIRD FORMULA, wherein the THIRD FORMULA is $$x = \frac{L_1 \cdot X + L_2 \cdot Y + L_3 \cdot Z + L_4}{L_9 \cdot X + L_{10} \cdot Y + L_{11} \cdot Z + 1}$$

$$y = \frac{L_5 \cdot X + L_6 \cdot Y + L_7 \cdot Z + L_8}{L_9 \cdot X + L_{10} \cdot Y + L_{11} \cdot Z + 1}$$

(x,y): Photographic coordinates (X,Y,Z): Three-dimensional coordinates of an objective space $L_1$ to $L_{11}$: Unknown variables in the DLT method.

* * * * *